US012606039B2

(12) United States Patent
Gritsch

(10) Patent No.: US 12,606,039 B2
(45) Date of Patent: Apr. 21, 2026

(54) CHARGING ENERGY STORAGE UNITS OF A VEHICLE AT WEAK ENERGY SUPPLY SYSTEMS

(71) Applicant: Siemens Aktiengesellschaft, Munich (DE)

(72) Inventor: Christian Gritsch, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 644 days.

(21) Appl. No.: 18/022,046

(22) PCT Filed: Jul. 14, 2021

(86) PCT No.: PCT/EP2021/069643
§ 371 (c)(1),
(2) Date: Feb. 17, 2023

(87) PCT Pub. No.: WO2022/037855
PCT Pub. Date: Feb. 24, 2022

(65) Prior Publication Data
US 2023/0347764 A1     Nov. 2, 2023

(30) Foreign Application Priority Data

Aug. 21, 2020   (EP) ..................................... 20192163

(51) Int. Cl.
*B60L 53/24*          (2019.01)
*B60L 53/14*          (2019.01)
*B60L 53/31*          (2019.01)
(52) U.S. Cl.
CPC ............... *B60L 53/24* (2019.02); *B60L 53/14* (2019.02); *B60L 53/31* (2019.02);
(Continued)

(58) Field of Classification Search
CPC .......... B60L 53/24; B60L 53/14; B60L 53/31; B60L 2200/32; B60L 2210/10; B60L 2210/30
(Continued)

(56) References Cited

U.S. PATENT DOCUMENTS

| | | | |
|---|---|---|---|
| 9,362,838 B1 * | 6/2016 | Balogh ................... | H02M 7/04 |
| 11,958,372 B2 * | 4/2024 | Skutt ...................... | B60L 53/60 |

(Continued)

FOREIGN PATENT DOCUMENTS

| | | |
|---|---|---|
| CN | 105790337 A | 7/2016 |
| CN | 109414997 A | 3/2019 |

(Continued)

OTHER PUBLICATIONS

PCT International Search Report mailed Mar. 11, 2021 corresponding to PCT International Application No. PCT/EP2021/069643 filed Jul. 14, 2021.

*Primary Examiner* — Laura K Tso
(74) *Attorney, Agent, or Firm* — Henry M. Feiereisen LLC

(57) ABSTRACT

An on-board power subsystem has an energy storage unit and a control device for charging the energy storage unit, as well as an on-board power connection for connection to electrical components of the vehicle, and a DC voltage connection for connection to a land-based charging station and an energy subsystem. A switching device is arranged between the on-board power connection and the energy subsystem, and a charger is arranged between the energy storage unit and the energy subsystem. The on-board power subsystem has at least one power converter connected on the AC voltage side to the energy subsystem and operable both as an AC/DC converter and as a DC/DC converter. The control device can operate the energy subsystem as a DC (Continued)

voltage grid during the charging process and as an AC voltage grid during independent operation of the vehicle.

16 Claims, 4 Drawing Sheets

(52) U.S. Cl.
CPC ....... *B60L 2200/32* (2013.01); *B60L 2210/10* (2013.01); *B60L 2210/30* (2013.01)

(58) Field of Classification Search
USPC ................................................ 320/109, 104
See application file for complete search history.

(56) References Cited

U.S. PATENT DOCUMENTS

| 2019/0168628 | A1 | 6/2019 | Pfeilschifter et al. |
| 2019/0210475 | A1 | 7/2019 | Pfeilschifter et al. |
| 2020/0044443 | A1 | 2/2020 | Gritsch |
| 2020/0062138 | A1 | 2/2020 | Smolenaers |

FOREIGN PATENT DOCUMENTS

| DE | 102009027787 | A1 | 1/2011 |
| DE | 102012210284 | A1 | 12/2013 |
| EP | 3605771 | A1 | 2/2020 |

* cited by examiner

CHARGING ENERGY STORAGE UNITS OF A VEHICLE AT WEAK ENERGY SUPPLY SYSTEMS

CROSS-REFERENCES TO RELATED APPLICATIONS

This application is the U.S. National Stage of International Application No. PCT/EP2021/069643, filed Jul. 14, 2021, which designated the United States and has been published as International Publication No. WO 2022/037855 A1 and which claims the priority of European Patent Application, Serial No. 20192163.2, filed Aug. 21, 2020, pursuant to 35 U.S.C. 119 (a)-(d).

BACKGROUND OF THE INVENTION

The invention relates to an onboard power subsystem for a vehicle, in particular for a watercraft, wherein the onboard power subsystem has at least one energy storage unit and a closed-loop control device for the charging of the energy storage units of the vehicle from a land-based charging station. The invention further relates to a vehicle, in particular a watercraft, having at least one such onboard power subsystem. The invention further relates to a land-based charging station, having a land-based energy storage unit and a land-based power converter. The invention further relates to a charging system having such an onboard power subsystem or such a vehicle and such a land-based charging station. The invention further relates to a method for operating such an onboard power subsystem or such a vehicle.

At the present time in the field of vehicles, in particular in the case of ferries and other ships, for short and medium distances, the diesel engine is increasingly being supplanted and replaced by electrical drive systems having energy storage units, such as batteries for example. Since at the locations of the land-based charging stations, such as ship's berths for example, often only weak grids are available, at which the electrical power that can be drawn is limited, a land-based energy storage unit is also provided in addition to the onboard energy storage unit (battery). In this arrangement the energy grid operator makes continuous power available through the energy supply system, which however is not sufficient to charge the energy storage unit of the vehicle, such as for example of the watercraft, which is only berthed for a short while, in a reasonable time. For this reason a land-based energy storage unit is continuously charged and its energy is transferred from the land-based to the onboard energy storage unit while the vehicle is berthed.

In this case the land-based energy storage unit is charged by AC voltage from the energy supply system being converted into DC voltage. To charge the onboard energy storage unit the DC voltage of the land-based energy storage unit is again converted into AC voltage. The onboard energy storage unit is then charged using alternating current, which is then converted back into a direct current in the vehicle.

To this end a plurality of homogeneous components are arranged on land and onboard in order to ensure this flow of energy.

The object of the invention is to improve the charging of an onboard energy storage unit.

SUMMARY OF THE INVENTION

This object is achieved by an onboard power subsystem for a vehicle, in particular for a watercraft, wherein the onboard power subsystem has at least one energy storage unit, a closed-loop control device for the charging of the energy storage units of the vehicle, an onboard power connection for connection to electrical components of the vehicle, a DC voltage connection for connection to a land-based charging station and an energy subsystem, wherein a switching device is arranged between the onboard power connection and the energy subsystem, wherein a charger is arranged between the energy storage unit and the energy subsystem, wherein the DC voltage connection is electrically conductively connected to the energy subsystem, wherein the onboard power subsystem has at least one power converter that is connected on the AC voltage side to the energy subsystem and can be operated both as an AC/DC converter and as a DC/DC converter, wherein the power converter is configured, by way of the closed-loop control device, to operate the energy subsystem as a DC voltage system during the charging process and as an AC voltage system during independent operation of the vehicle. This object is further achieved by a vehicle, in particular a watercraft, having at least one such onboard power subsystem. The object is further achieved by a land-based charging station, having a land-based energy storage unit and a land-based power converter, wherein a land-based DC voltage connection for connection to a DC voltage connection of such an onboard power subsystem or of such a vehicle is arranged in the electrical connection between the land-based energy storage unit and the land-based power converter, wherein the amount of power that can be transmitted via the land-based power converter is less than the continuous power that can be transmitted via the land-based DC voltage connection. The object is further achieved by a charging system having such an onboard power subsystem or such a vehicle and such a land-based charging station, wherein the land-based DC voltage connection of the land-based charging station is electrically connected to the DC voltage connection of the onboard power subsystem. The object is further achieved by a method for operating such an onboard power subsystem or such a vehicle or such a charging system, wherein the power converter is operated as a DC/DC converter during a charging process and as an AC/DC converter during independent operation.

Further advantageous embodiments of the invention are specified in the dependent claims.

The invention is based inter alia on the knowledge that the efficiency of charging can be increased if the energy transmission takes place by way of DC voltage. In this case certain lossy conversion processes can be omitted. At the same time components of the onboard power subsystem or of the vehicle that are already present can be used in different operating modes. The power converter can in this case be used as a DC/DC converter during the charging process and as an AC/DC converter outside of charging, in other words if no electrical connection exists to a land-based charging station. Operation without a connection to a charging station is also referred to as independent operation, since it is independent of a land-based energy supply.

In this case a distinction is made between the components that are arranged in the onboard power subsystem or vehicle, such as power converters, DC converters and step-down converters for example, and the function that said components can perform, such as a DC/DC converter or an AC/DC converter for example. Thus for example a power converter can be operated both as a DC/DC converter and as an AC/DC converter.

To switch between the operating modes of the AC/DC converter and of the DC/DC converter the power converter can be embodied as single-phase or three-phase. When selecting a suitable switching frequency it has additionally proved to be advantageous if an inductor is present at at least one AC voltage connection. In addition for reasons of symmetry it is advantageous for a uniform load if the identical inductor is arranged at ail AC voltage connections, at least identical in respect of its electrical behavior. The inductor can in this case for example be formed by a reactor or a transformer. Alternatively or additionally it is possible to use the line inductance of the supply cables, in other words of the connection cables of the energy subsystem, as an inductor. In other words the inductor is then formed by the lines, in particular cables, of the energy subsystem.

For charging, energy is drawn from the land-based energy storage unit and is transmitted by way of DC voltage and direct current to the energy storage unit of the onboard power subsystem. At the land-based charging station the land-based power converter hence need only be designed for the transmission of the energy for charging the land-based energy storage unit from the energy supply system. The power required for this is significantly less than the charging power for the vehicle charging. Since the land-based DC voltage connection for transmitting the electrical energy to the onboard power subsystem is located between a land-based power converter and a land-based energy storage unit, no further current flows via the land-based power converter during charging. Firstly this saves electrical losses, and secondly the land-based power converter can be designed to be significantly less powerful and more convenient, since because of the weak grid at the land-based charging station a high level of power is not available there.

Thus the land-based power converter need only be designed for the low charging current because of the weak land-based system and not for the high discharge current for rapid charging of the vehicle batteries as in previously known applications.

When a DC voltage is applied a direct current is then transmitted from the land-based DC voltage connection to the DC voltage connection of the onboard power subsystem. This DC voltage connection is connected to an energy system of the onboard power subsystem. By means of the power converter this can be operated as a DC voltage system or as an AC voltage system. To this end in the first case the power converter is operated during the charging process as a DC/DC converter and in the second case is operated during independent operation as an AC/DC converter. Depending on the mode of operation of the vehicle, in other words charging operation or independent operation, the power converter component can in this case be operated and used differently. Thanks to this dual usage of an existing and expensive component the onboard power subsystem can be designed particularly cost-effectively for charging.

If the energy system is designed as three-phase, in other words has three conductors, then in the event of operation as an AC voltage system it can be operated as a three-phase system. During the charging process, if it is operated as a DC voltage system, the DC voltage is applied between two of the three conductors.

The power converter is connected to the energy storage unit on the DC voltage side, i.e. by its intermediate circuit. This may take place directly if the power converter is arranged in the charger. Alternatively the power converter can also be connected to the energy storage unit on the DC voltage side for example by way of a DC converter, such as for example a step-down converter, or by way of the charger, providing the power converter is arranged outside the charger.

In one advantageous embodiment of the invention the power converter is arranged in the charger. The power converter, which as a function of the operation switches between operation as a DC/DC converter and as an AC/DC converter, can in this case be formed by a power converter in a charger. The charger is then directly connected to the DC voltage connection of the onboard power subsystem by way of the energy system. Providing the voltage of the land-based energy storage unit is lower than the voltage of the energy storage unit of the onboard power subsystem, the power converter of the charger can control the charging process in an open-looped or closed-looped manner.

In a further advantageous embodiment of the invention a step-down converter is arranged in the charger on an intermediate circuit of the power converter such that the step-down converter converts a voltage applied to the intermediate circuit into a lower voltage at the energy storage unit. In this embodiment a flow of energy between the land-based energy storage unit and the energy storage unit of the onboard power subsystem can take place regardless of the level of the voltage of the respective energy storage units. This means that the voltage of the land-based energy storage unit can be less than, equal to or greater than the voltage of the energy storage unit of the onboard power subsystem. This arrangement provides maximum flexibility and with the onboard power subsystem can charge the energy storage unit at all charging stations with a DC voltage transmission regardless of the voltage level of the land-based energy storage unit.

In a further advantageous embodiment of the invention the onboard power subsystem has an inverter to supply power to a drive motor, the power converter being formed by the inverter. Since during charging the drive motor is generally not in operation, the inverter can be used as a power converter for open-looped control of the charging. The flow of energy can also be open-looped controlled by means of the inverter. Thus efficient use is made of the components already present in the vehicle. The electrical connection between inverter and drive motor is in this case advantageously disconnected, for example by means of a motor switch, which can for example be embodied as a mechanical switch, contactor or disconnector.

In a further advantageous embodiment of the invention the charger has a DC converter. In this embodiment too, thanks to the use of a DC converter the flow of energy between the land-based energy storage unit and the energy storage unit of the onboard power subsystem can take place regardless of the voltage level of the respective energy storage units. This means that the voltage of the land-based energy storage unit can be less than, equal to or greater than the voltage of the energy storage unit of the onboard power subsystem. Thus this embodiment too provides maximum flexibility and with the onboard power subsystem can charge the energy storage unit at all charging stations with a DC voltage transmission regardless of the voltage level of the land-based energy storage unit.

The closed-loop or open-looped control of the flow of energy for charging the energy storage unit can in this case take place by way of the inverter as a power converter or by the DC converter of the charger.

In the case of the DC converter it can be embodied as a step-up converter, step-down converter or as a combination of step-up converter and step-down converter.

In a further advantageous embodiment of the invention the onboard power subsystem has a power rectifier which with the inverter forms a frequency converter for supplying the drive motor with power, wherein the power rectifier forms the switching device. It is possible to dispense with a separate switch as a switching device if the power rectifier is fitted with switchable semiconductors. In this embodiment too it is possible to dispense with an additional component to implement the switching device, by making use of existing components of the onboard power subsystem for charging. Thus the onboard power subsystem works particularly efficiently and can be manufactured cost-effectively.

In this case the power rectifier can disconnect the onboard power connection and the energy subsystem from one another or connect them to one another thanks to the function of an AC/DC converter and exchange current between energy subsystem and onboard power connection.

In a further advantageous embodiment of the invention an onboard power converter is arranged between the energy subsystem and the onboard power connection. In this case during the charging process electrical components of the vehicle are supplied with electrical energy from the energy subsystem by means of the onboard power converter. To ensure that the onboard power system is also supplied with electrical energy during the charging process when the switching device is open, the onboard power converter can be integrated into the onboard power subsystem. Thus it is possible for the electrical components to be supplied with energy by the land-based charging station. It is possible to dispense with an additional energy source or an energy storage unit for ensuring the power supply to the electrical components of the vehicle, such as an additional battery or a diesel generator for example.

In a further advantageous embodiment of the invention the vehicle has at least two onboard power subsystems, wherein the onboard power subsystems are electrically connected to one another respectively at the onboard power connection and at the DC voltage connection. For vehicles especially, in particular for watercraft, a redundant energy supply from the energy storage unit and charging of the energy storage unit is of great importance, to ensure high reliability and high availability of the vehicle. For a watercraft especially this is particularly advantageous for safe operation. The power supply to the electrical components of the vehicle and the charging of the energy storage unit can easily be configured redundantly with two or more onboard power subsystems. In this case the individual components of the respective onboard power subsystems such as power converters and energy storage units can then also be dimensioned to be smaller. Taking the example of two onboard power subsystems the power converter and the energy storage units can then for example be implemented at half power. If a fault occurs in a first of two onboard power subsystems, the energy storage unit of the second onboard power subsystem can still be charged and the operation of the vehicle can be ensured, with power being supplied to the electrical components.

BRIEF DESCRIPTION OF THE DRAWING

The invention is described and explained in greater detail below using the exemplary embodiments represented in the figures, in which.

DETAILED DESCRIPTION OF PREFERRED EMBODIMENTS

Figure 1:
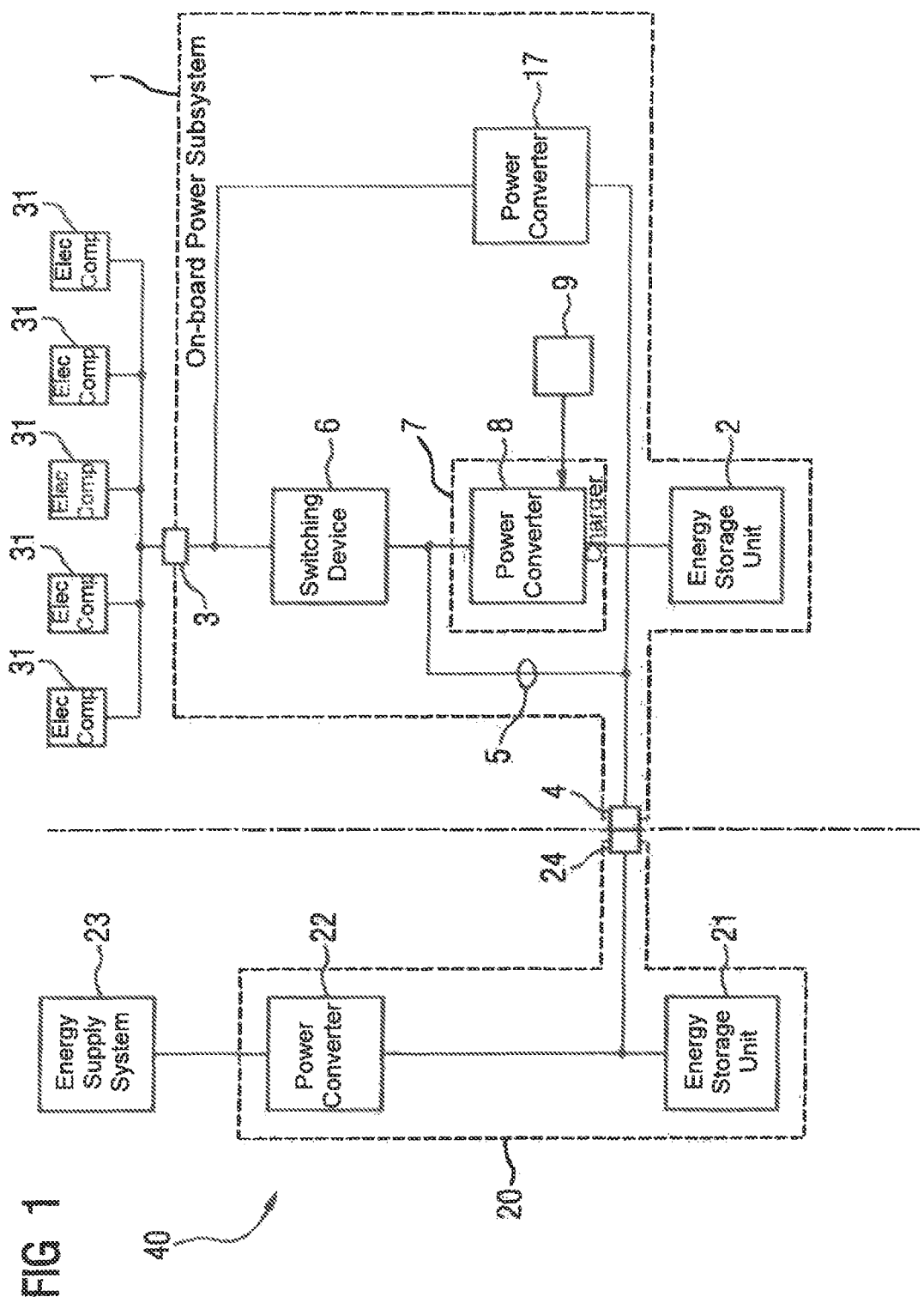
FIG. 1 shows a first exemplary embodiment of a charging system.

FIG. 1 shows a first exemplary embodiment of a charging system 40. This charging system 40 comprises an onboard power subsystem 1 and a land-based charging station 20. The land-based charging station 20 has a land-based power converter 22 and a land-based energy storage unit 21. Since the land-based energy storage unit 21 has a DC voltage at its connections, the line voltage of an energy supply system 23 that is used to charge the land-based energy storage unit 21 is converted into a DC voltage with the aid of the land-based power converter 22. The land-based energy storage unit 21 serves to reduce the load on the energy supply system 23 while a vehicle 30 (not shown here) is being charged. So that not all the charging power has to be drawn from the energy supply system 23, the energy is buffered in the land-based energy storage unit 21. A branch to the land-based DC voltage connection 24 is arranged in the DC voltage connection between a land-based power converter 22 and a land-based energy storage unit 21 and is provided for connection to a DC voltage connection 4 of the onboard power subsystem 1 of the vehicle 30. During charging all the energy or at least most of the energy is drawn from the land-based energy storage unit 21, in order to keep the currents in the energy supply system 23 low, i.e. below a definable limit value. As a result the load on the energy supply system 23 is reduced. This is advantageous especially in the case of a weak grid, as is often the case inshore or in other ship's berths, because in this way it is possible to avoid that the energy supply system 23 is impacted, in the form of voltage dips for example.

The onboard power subsystem 1 has an energy storage unit 2 that can be charged by the land-based charging station 20. To this end the onboard power subsystem 1 is connected at its DC voltage connection 4 to the land-based DC voltage connection 24. The DC voltage connection 4 is connected to an energy subsystem 5. The energy subsystem 5 can in this case for example be configured as a bulbar. A power converter 8 is arranged between the energy subsystem 5 and the energy storage unit 2. On the AC voltage side this power converter 8 is connected to the energy subsystem 5, and on the DC voltage side to the energy storage unit 2. During the charging process the energy subsystem 5 is operated as a DC voltage system and the power converter 8 controls the charging process of the energy storage unit 2 in an open-looped or closed-looped manner. In this exemplary embodiment the power converter 8 is part of a charger 7. In this case the energy storage unit 2 can be connected directly to the intermediate circuit of the power converter 8. Alternatively it is also possible for further components such as for example a step-down converter to be arranged between the intermediate circuit of the power converter 8 and the energy storage unit 2. Such an arrangement is described and explained in greater detail below in FIG. 3.

To be able to operate the energy subsystem 5 as a DC voltage system, a switching device 6 is arranged between the onboard power connection 3 and the energy subsystem 5, and electrically disconnects the onboard power connection 3 and the energy subsystem 5 from one another, for example by means of a switch. Since an AC voltage for supplying power to electrical components 31 of the vehicle 30 is applied at the onboard power connection 3, it is also possible to implement the switching device 6 as a further power converter that is capable of producing an exchange of energy between the onboard power connection 3 with alternating current and the energy subsystem 5 with direct current, in that it is operated as an AC/DC converter.

The power converter 8 is controlled in an open-looped or closed-looped manner by means of a closed-loop control device 9. This closed-loop control device 9 can for example be part of the charger 7 or can also, as shown, be arranged outside the charger 7.

If the switching device 6 is configured as a switch and during the charging process disconnects the onboard power connection 3 from the energy subsystem 5, it has proved to be advantageous to arrange an onboard power converter 17 between energy subsystem 5 and onboard power connection 3, which during the charging process supplies the electrical components 31 of the vehicle 30 with electrical energy. Thus it is possible to dispense with energy sources, such as a diesel generator in the case of ships for example, or further storage units, since the energy can then be supplied from the land-based charging station by way of the energy subsystem 5.

During the charging process the energy subsystem 5 is operated as a DC voltage system. During independent operation, in other words outside the charging process, the energy subsystem 5 is operated as an AC voltage system which supplies the electrical components 31 of the vehicle 30 with electrical energy from the energy storage unit 2 by way of the power converter 8.

Figure 2:
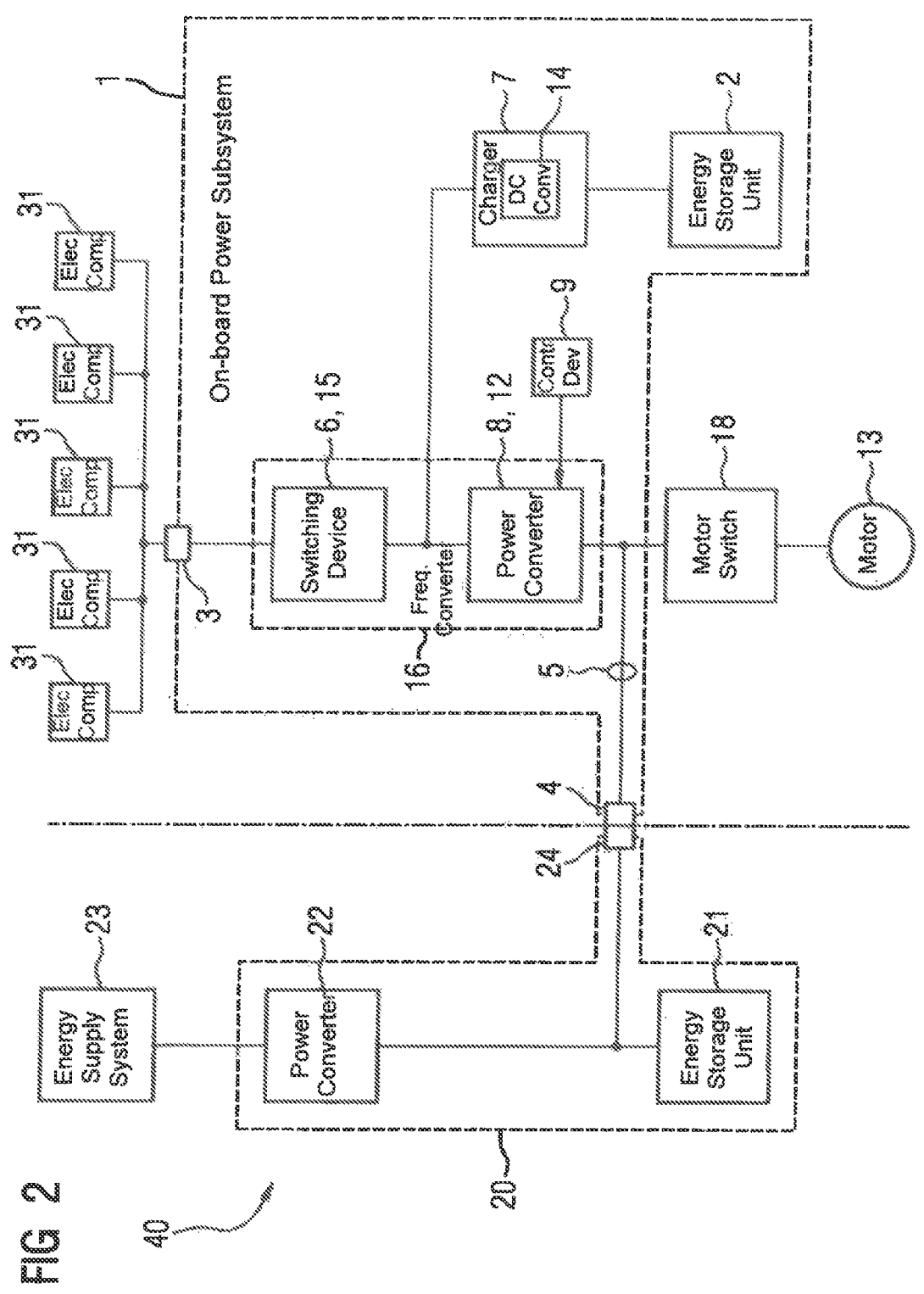
FIG. 2 shows a second exemplary embodiment of a charging system.

FIG. 2 shows a further exemplary embodiment of a charging system 40. To avoid repetitions, reference is made to the description for FIG. 1 and to the reference characters Introduced there. In this exemplary embodiment the power converter 8 is formed not by the charger 7, but by the drive system of the vehicle 30. The drive system comprises a power rectifier 15 and an inverter 12 to supply a drive motor 13 with power. In this case the power rectifier 15 and the inverter 12 form a frequency converter 16. The power converter 8 is in this case formed by the inverter 12. To avoid currents and losses caused thereby in the drive motor 13 the latter is disconnected from the energy subsystem 5 during the charging process by means of a motor switch 18. Since the vehicle 30 is not being driven during the charging process, this is an advantage rather than a disadvantage, since the inverter 15 can advantageously be used during charging for charging the vehicle 30. In this exemplary embodiment the energy storage unit 2 is arranged by way of a charger 7 with the intermediate circuit of the frequency converter 16, in other words at the connection between inverter 12 and power rectifier 15. The open-looped or closed-loop control of the charging process can in this case be undertaken by the power converter 8 or by the charger 7. As shown in FIG. 2, the charger 7 has a DC converter 14.

In this exemplary embodiment the switching device 6 is formed by the power rectifier 15. This can either disconnect the onboard power connection 3 from the energy subsystem 5 or, providing the power rectifier 15 has switchable semiconductors, also connect the AC voltage of the onboard power connection 3 to the DC voltage of the energy subsystem 5 and ensure a transmission of energy between these points. In this exemplary embodiment too the energy subsystem 5 is operated as a DC voltage system during the charging process and as an AC voltage system during independent operation. By using the power rectifier 15 as a switching device an onboard power supply converter 17 becomes superfluous in cases in which the power rectifier 15 has switchable semiconductors, so that it is not shown in this exemplary embodiment. In this exemplary embodiment too the onboard power supply converter 17 can optionally be inserted between energy subsystem 5 and onboard power connection 3, in order to supply the electrical components 31 with energy from the energy subsystem 5 during the charging process.

Figure 3:
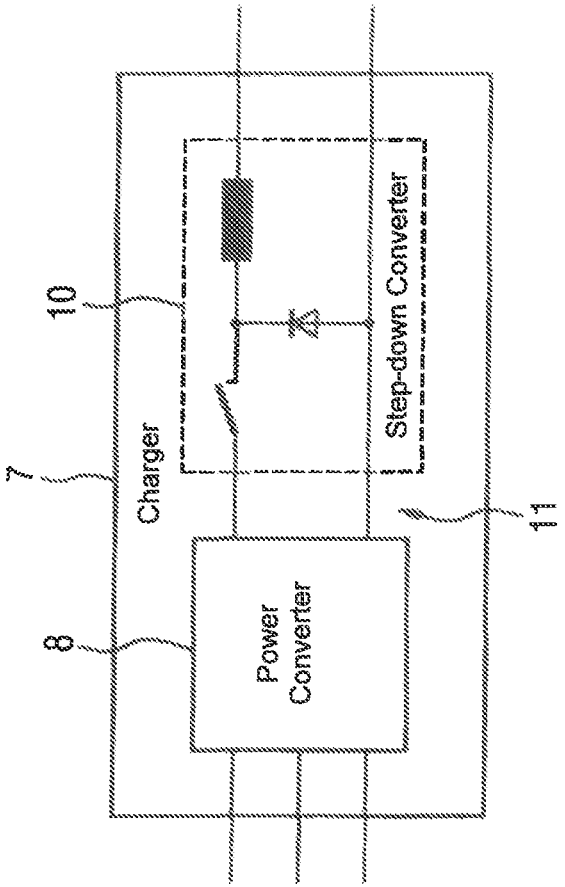
FIG. 3 shows a charger with power converter and step-down converter.

FIG. 3 shows an exemplary embodiment of a charger 7, which has a power converter 8 and a step-down converter 10 connected thereto on the DC side. The step-down converter 10 is arranged in the charger 7 on an intermediate circuit 11 of the power converter 8 such that the step-down converter 10 converts a voltage applied to the intermediate circuit 11 into a lower voltage at the energy storage unit. This charger 7 can be employed in the exemplary embodiment in FIG. 1, so that the energy storage unit 2 can be charged regardless of the voltage level at the DC voltage connection 4.

Figure 4:
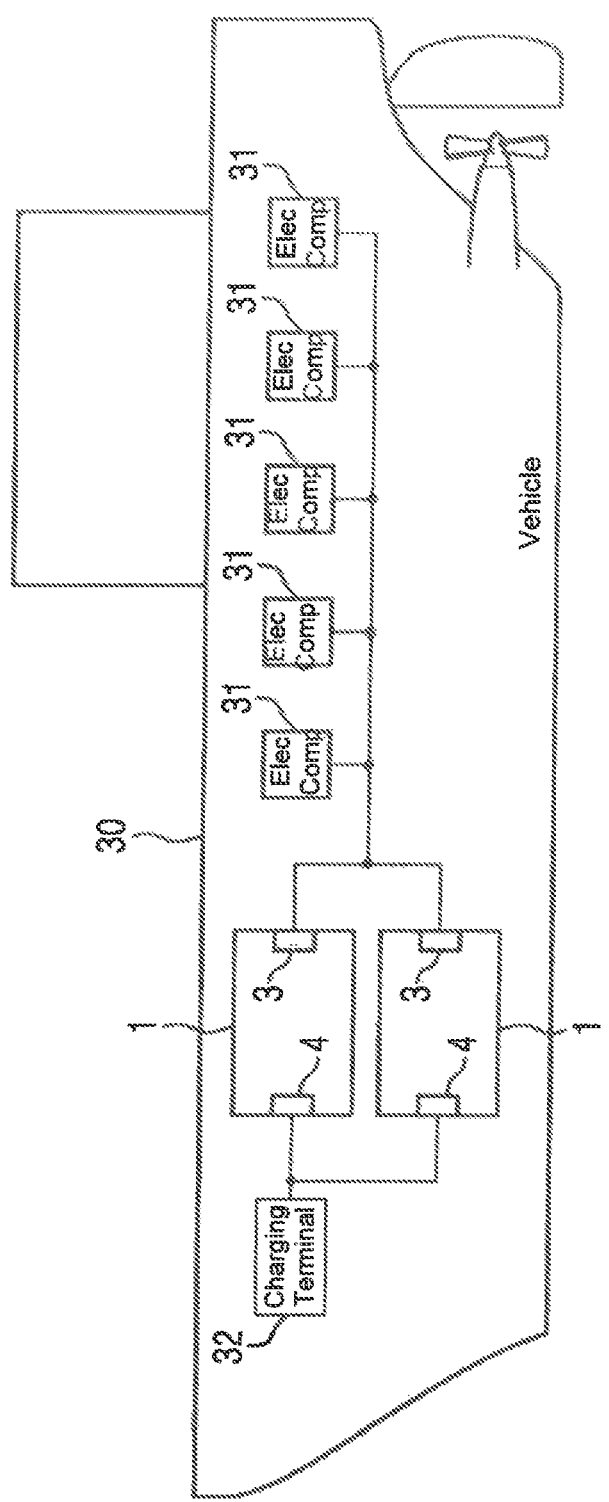
FIG. 4 shows a ship with a redundant onboard power subsystem.

FIG. 4 shows a vehicle 30, in this exemplary embodiment embodied as a watercraft. For reasons of redundancy this vehicle 30 has two onboard power subsystems 1, the connections 4 of which are connected to a charging terminal 32. Likewise the electrical components 31 of the vehicle can be supplied with power from both onboard power subsystems 1, since the onboard power supply connections 3 are arranged in parallel and thereby are connected to one another.

In summary, the invention relates to an onboard power subsystem for a vehicle, in particular for a watercraft, wherein the onboard power subsystem has at least one energy storage unit and a closed-loop control device for the charging of the energy storage unit of the vehicle. To improve the charging of the energy storage unit it is proposed that the onboard power subsystem further has an onboard power connection for connection to electrical components of the vehicle, a DC voltage connection for connection to a land-based charging station and an energy subsystem, wherein a switching device is arranged between the onboard power connection and the energy subsystem, wherein a charger is arranged between the energy storage unit and the energy subsystem, wherein the DC voltage connection is electrically conductively connected to the energy subsystem, wherein the onboard power subsystem has at least one power converter that is connected on the AC voltage side to the energy subsystem and can be operated both as an AC/DC converter and as a DC/DC converter, wherein the power converter is configured, by way of the closed-loop control device, to operate the energy subsystem as a DC voltage system during the charging process and to operate it as an AC voltage system during independent operation of the vehicle. The invention further relates to a vehicle having such an onboard power subsystem, to a land-based charging station, and to a charging system. The invention further relates to a method for operating such an onboard power subsystem or such a vehicle or such a charging system, wherein the power converter is operated as a DC/DC converter during a charging process and as an AC/DC converter during independent operation.

What is claimed is:

1. An onboard power subsystem for a vehicle, the onboard power subsystem comprising:
   an energy storage unit;
   a closed-loop control device for charging the energy storage unit of the vehicle;
   an onboard power connection for connecting electrical components of the vehicle to the onboard power subsystem;
   an energy subsystem;
   a switching device arranged between the onboard power connection and the energy subsystem;

a DC voltage connection electrically conductively connected to the energy subsystem and configured to connect the onboard power subsystem to a land-based charging station;

a charger arranged between the energy storage unit and the energy subsystem; and a power converter operable as both as an AC/DC converter and as a DC/DC converter, and connected on an AC voltage side to the energy subsystem, wherein the power converter is configured, by way of the closed-loop control device, to operate the energy subsystem as a DC voltage system during a charging process and as an AC voltage system during an independent operation of the vehicle.

2. The onboard power subsystem of claim 1, wherein the onboard power connection provides an AC voltage for supplying power to the electrical components of the vehicle.

3. The onboard power subsystem of claim 1, wherein the power converter is arranged in the charger.

4. The onboard power subsystem of claim 3, wherein the power converter in the charger comprises an intermediate circuit Including a step-down converter, with the step-down converter converting a voltage applied to the intermediate circuit into a lower voltage at the energy storage unit.

5. The onboard power subsystem of claim 1, wherein the power converter is constructed as an inverter supplying electrical power to a drive motor.

6. The onboard power subsystem of claim 5, wherein the charger comprises a DC converter.

7. The onboard power subsystem of claim 5, wherein the switching device comprises a power rectifier which in conjunction with the inverter forms a frequency converter for supplying power to the drive motor.

8. The onboard power subsystem of claim 1, further comprising an onboard power converter arranged between the energy subsystem and the onboard power connection.

9. A vehicle, comprising an onboard power subsystem as set forth in claim 1.

10. The vehicle of claim 9, further comprising at least two of said onboard power subsystem, wherein each of the two onboard power subsystems are electrically connected to one another at the onboard power connection and at the DC voltage connection.

11. A land-based charging station, comprising:

a land-based energy storage unit;

a land-based power converter connected by an electrical connection to the land-based energy storage unit; and a land-based DC voltage connection connected to the electrical connection for connection of the onboard power subsystem as set forth in claim 1, wherein power transmitted by the land-based power converter is less than a continuous power transmitted by the land-based DC voltage connection.

12. A charging system, comprising a land-based charging station comprising a land-based energy storage unit, a land-based power converter connected by an electrical connection to the land-based energy storage unit, and a land-based DC voltage connection connected to the electrical connection; and the onboard power subsystem as set forth in claim 1, wherein the land-based DC voltage connection of the land-based charging station is electrically connected to the DC voltage connection of the onboard power subsystem.

13. A method for operating an onboard power subsystem as set forth in claim 1, said method comprising:

operating the power converter as a DC/DC converter during a charging process; and operating the power converter as an AC/DC converter during an independent operation.

14. The method of claim 13, further comprising controlling power transmitted by the land-based charging station in a closed-loop manner via the power converter, or with a step-down converter of the power converter, or with the DC converter.

15. The method of claim 13, further comprising opening the switching device during the charging process.

16. The method of claim 13, further comprising supplying with the onboard power converter electrical energy from the energy subsystem to the electrical components of the vehicle during the charging process via a switching device comprising a power rectifier which in conjunction with the power converter constructed as an inverter forms a frequency converter.

* * * * *